United States Patent [19]
Fletcher et al.

[11] 3,965,354
[45] June 22, 1976

[54] RESISTIVE ANODE IMAGE CONVERTER

[76] Inventors: James C. Fletcher, Administrator of the National Aeronautics and Space Administration, with respect to an invention of; Michael L. Lampton; Francesco Paresce, both of Berkeley, Calif.

[22] Filed: Mar. 3, 1975

[21] Appl. No.: 555,336

[52] U.S. Cl. .............................. 250/336; 250/372
[51] Int. Cl.² ........................................ G01T 1/16
[58] Field of Search .......... 250/372, 203 R, 203 CT, 250/336, 385, 394, 395, 207; 356/4, 51

[56] References Cited
UNITED STATES PATENTS

| | | | |
|---|---|---|---|
| 3,715,594 | 2/1973 | Drohan et al. ..................... | 250/372 |
| 3,891,851 | 6/1975 | Fletcher ............................ | 250/385 |

*Primary Examiner*—Davis L. Willis
*Attorney, Agent, or Firm*—Nina M Lawrence; Gary F. Grafel; John R. Manning

[57] ABSTRACT

An apparatus is disclosed for imaging soft x-ray and ultraviolet electromagnetic radiation and charged particles. The apparatus includes a pair of microchannel electron multiplier plates that are connected in a cascaded chevron configuration which intercepts an incident beam of radiation or charged particles which are being imaged. Incident photons or charged particles strike the front surface of the chevron configuration causing emission of electrons. The electrons are accelerated by a voltage gradient and strike the inner side walls of the individual channels which comprise the microchannel electron multiplier plates causing emission of secondary electrons. Accelerated and multiplied secondary electrons impinge upon a resistive anode after they transverse the chevron configuration. A pulse position circuit converts the magnitude or transit time of the currents flowing from the point of impact of the electrons on the resistive anode to four contact electrodes mounted on their periphery of the resistive anode into the spatial coordinates of electron impact.

9 Claims, 2 Drawing Figures

RESISTIVE ANODE IMAGE CONVERTER

ORIGIN

The invention described herein was made in the performance of work under a NASA contract and is subject to the provisions of Section 305 of the National Aeronautics and Space Administration Act of 1958, Public Law 85–568 (72 stat. 435; 42 U.S.C. 2457),

BACKGROUND OF THE INVENTION

1. Field of the Invention

The invention relates to an apparatus used for the imaging of low intensity soft x-ray and ultraviolet electromagnetic radiation and charged particles. More particularly, the invention relates to an apparatus used for the imaging of low intensity soft x-ray and ultraviolet electromagnetic radiation which has high spatial resolution, low noise and excellent linearity.

A need has existed in celestial research for a soft x-ray and ultraviolet radiation detector having high one or two dimensional spatial resolution which permits full utilization of focusing and dispersing optics found in telescopes. When combined with an image forming optical system such a detector permits efficient spectroscopic measurement of extended sources or sensitive detection of point images whose positions are unknown. High resolution imaging is particularly advantageous when a point object is to be detected in the presence of a diffuse background as in many x-ray applications.

2. Description of the Prior Art

The development of apparatus for imaging soft x-ray and ultraviolet images of extremely low intensity such as those produced during celestial observation of distant points in outer space has progressed from simple exploratory photometric techniques employing large area collimated gas proportional counters, channel electron multipliers and photomultipliers to grazing incidence telescopes in soft x-ray astronomy and concave grating spectrometers in the study of planetary atmospheres.

A publication authored by the inventors of the present invention entitled "The Ranicon: A Resistive Anode Image Converter" appearing in Review of Scientific Instruments, Vol. 45, No. 9, September 1974, contains a comprehensive discussion of apparatus related to the present invention.

Charged particle detectors which detect the position of particle impact and measure particle energy are described in a publication entitled "A Hybrid Approach to Two Dimensional Charged Particle Position Sensing Preserving Energy Resolution" by W. M. Augustyniak, W. L. Brown and H. P. Lee published in the IEEE Transactions on Nuclear Science, NS-19, No. 3, p. 196 (1972). These devices detect the energy of a charged particle by sensing the number of electrons emitted from the surface of a semiconductor target upon particle impact thereon. The position of particle impact is detected by a chevron configuration of cascaded microchannel electron multiplier plates which are coupled to a resistive collector plate.

A charged particle detector of the aforementioned type differs fundamentally from the present invention in that detection of charged particles is accomplished within the semiconductor target prior to amplification by the chevron configuration of cascaded microchannel electron multiplier plates. On the other hand, both detection and amplification of soft x-rays, ultraviolet electromagnetic radiation or charged particles by the present invention is accomplished within a chevron configuration of cascaded microchannel electron multiplier plates.

SUMMARY OF THE INVENTION

The disadvantages and limitations of prior art charge imaging systems are obviated by the present invention which provides an imaging system having high spatial resolution, extremely low noise and excellent linearity.

The present invention comprises a chevron configuration of two cascaded microchannel electron multiplier plates which both detect and amplify soft x-rays, ultraviolet electromagnetic radiation or charged particles which impinge upon the front surface of the first microchannel electron multiplier plate; a contiguously mounted continuous resistive anode which functions as a target for the amplified electron image produced by the chevron configuration; and a pulse position analysis circuit for producing electrical signals which represent the spatial coordinates of the points of impact of the electrons, which comprise the electron image, upon the resistive anode.

DESCRIPTION OF THE PREFERRED EMBODIMENT

At the outset of the description of the preferred embodiment, it should be noted that the article written by the present inventors, cited supra, is incorporated by reference in its entirety in this specification for its detailed description of the present invention.

Figure 1:
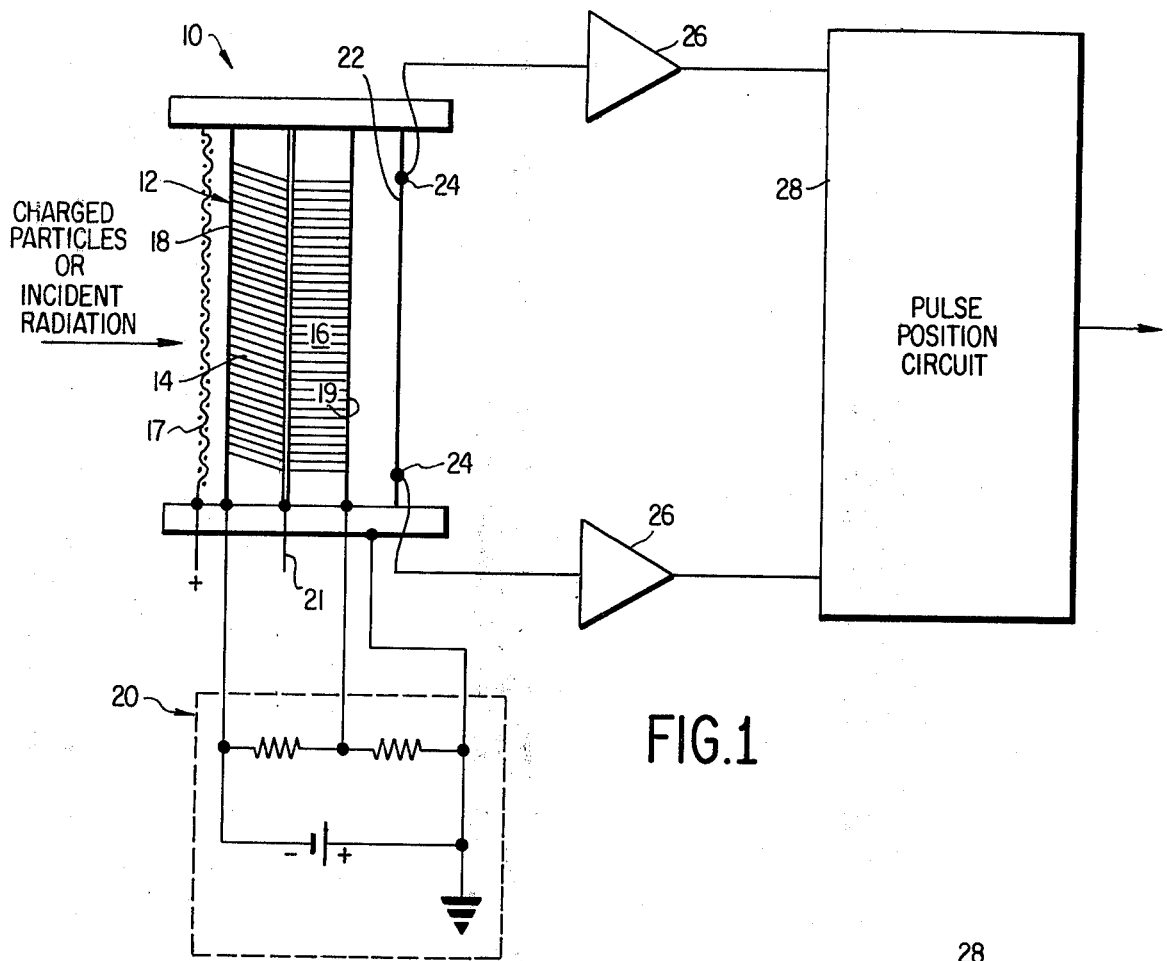
FIG. 1 is a schematic of a resistive anode image converter constructed according to the present invention.

Referring to FIG. 1, a resistive anode image converter 10 constructed according to the present invention is housed by an evacuated envelope (not shown). The chevron configuration 12 of cascaded microchannel electron multiplier plates 14 and 16 and the first microchannel plate 14 both detect incident soft x-rays, ultraviolet electromagnetic radiation or charged particles and amplify (gains up to $10^7$) and accelerate the electron image produced during detection. As is well known, the chevron configuration 12 has the axis of the individual channels which comprise the first microchannel electron multiplier plate 14 inclined to the direction of incident soft x-rays, ultraviolet electromagnetic radiation or charged particles.

Microchannel electron multiplier plates have been described in detail in publications. For example, see an article entitled "Microchannel Plate Imaging Detectors," published in the IEEE Transactions on Nuclear Science, NS-19 No. 3 p. 75, 1972, by D. J. Ruggieri.

Impingement of photons of soft x-rays, ultraviolet electromagnetic radiation or charged particles upon the front surface 18 of the first microchannel electron multiplier plate 14 produces emission of electrons which are accelerated by the electrostatic field produced by biasing source 20. The front surface 18 of the first microchannel electron multiplier plate 14 is coated with an electron emissive material. Surface 18 may be coated with CsI or $MgF_2$ to increase the cutoff wavelength. The trajectory of the electrons emitted by surface 18 causes them to strike the inner surfaces of the individual channels which comprise the microchannel electron multiplier plates 14 and 16. Secondary emission occurs as the electrons repeatedly strike the inner walls of the individual channels during their flight through microchannel electron multiplier plates 14 and 16.

One or more particle rejection grids 17 which are biased positively with respect to the front surface 18 of the microchannel electron multiplier plate 14 may be provided to repel low energy charged particles during photon imaging applications without affecting the trajectory of the photons. The grid 17 comprises a means for repelling low energy charged particles.

The channels which comprise the microchannel electron multiplier plates 14 and 16 have the following physical characteristics. Their length to diameter ratio is in the order of 50; their diameters ranging fom 15 to 50 microns. This length to diameter ratio ensures multiple collision of secondary electrons with the inner cylindrical surfaces of the channels to provide high gain. The spacing between the individual channels, which also ranges between 15 to 50 microns, ensures comparable spatial resolution.

The microchannel electron multiplier plate 14 and the chevron configuration 12 comprises a means for detecting incident soft x-ray and ultraviolet electromagnetic radiation and charged particles and for producing an amplified and accelerated electron image which corresponds spatially to the image of the incident radiation and charged particles.

After transversing the chevron configuration 12, the electron image impinges upon continuous resistive anode target 22. The resistive anode 22 may be an insulated substrate coated with conductive material such as colliodal graphite. Glass or ceramic substrates may be used. A resistive anode 22 having greater precision and uniformity may be fabricated by techniques employed in the manufacture of thick-film hybrid electronic circuits, i.e., a conductive glaze fired on a ceramic substrate having a resistivity of $10^6$–$10^7$ ohms per square. A third technique of anode fabrication involves hydrogen annealing a lead-bismuth doped flat glass substrate. See a publication published in the Journal of Physics E 6, 397, 1973, written by J. W. Stumpel, P. W. Sanford, and H. F. Goddard.

The impingement of the electron image upon resistive anode 22 produces current flow from the point of impact on the anode to four contact electrodes 24 which are electrically coupled to the periphery of the resistive anode. The four contact electrodes detect electrical signals that are converted into electrical signals on a real time basis which represent the spatial coordinates of the points of impact of the electrons which comprise the electron image that impinges upon resistive anode 22. The voltages appearing at the respective electrodes 24 are amplified by amplifiers 26 which are of well known construction.

Pulse position circuit 28 converts the amplified signals which are derived from the four contacts 24 into electrical signals which represent the spatial coordinates of the points of impact of the electrons comprising the electron image which impinge upon resistive anode 22.

Two basic types of well known pulse position circuit 28 may be used. The first type converts the relative amplitude of the voltages detected at the contacts 24 into spatial coordinate information. This type of circuit derives position of impact information relative to a first coordinate axis by evaluating $V_1/(V_1+V_2)$ or $(V_1-V_2)/(V_1+V_2)$ where $V_1$ and $V_2$ are the peak signal voltages from a pair of contacts 24 disposed at opposite corners or sides of the resistive anode. Derivation of the position of impact information relative to a second coordinate axis orthogonal to the first coordinate axis described supra is accomplished by performing the same arithematic evaluation on voltages derived from the remaining two contacts 24. A second type of pulse position circuit 28 analyzes the difference between the arrival times of currents flowing from the point of impact of electrons on the resistive anode 22 to the respective contacts 24 which is caused by the inherent distributed capacitance of the resistive anode 22. Circuits of the aforementioned two types are well known and are discussed in the inventors' publication cited supra.

Figure 2:
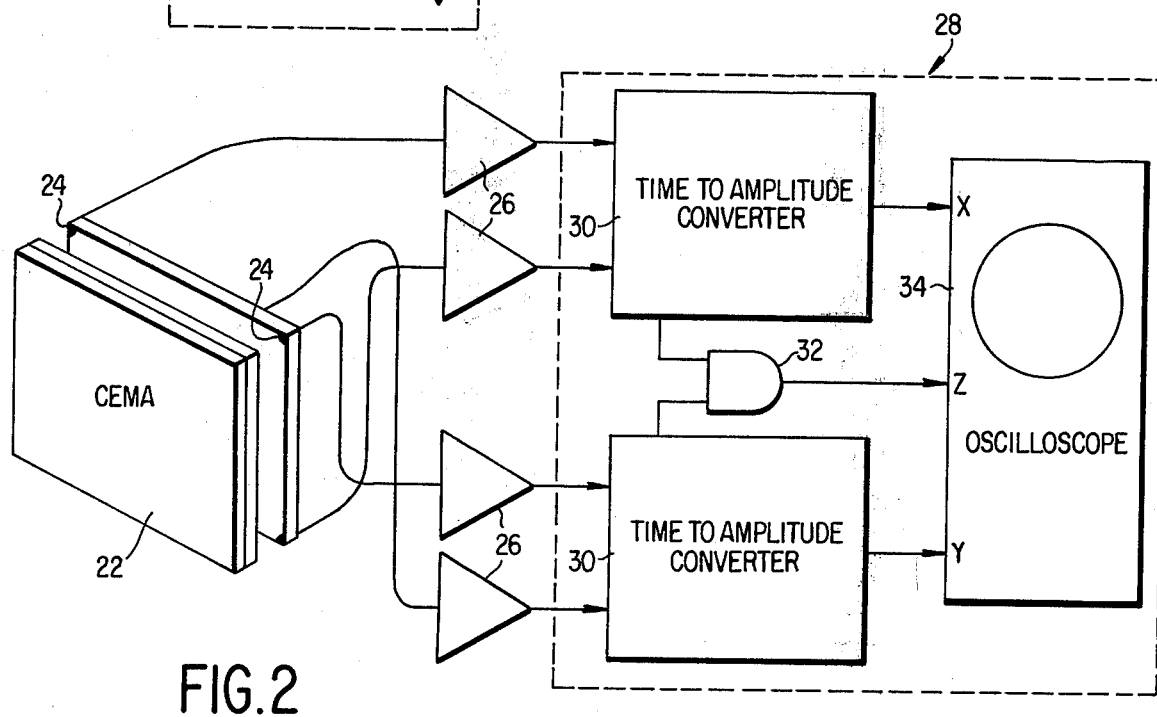
FIG. 2 is a schematic of the preferred type of pulse position analysis circuit used in the present invention.

The preferred type of pulse position circuit 28 is illustrated in detail in FIG. 2. Therein, like numerals are used to enumerate the same parts as enumerated in FIG. 1. The output signals from oppositely disposed contacts 24 are coupled respectively to gated inputs of a pair of time to amplitude converters 30 of a well known construction. As is well known, a time to amplitude converter utilizes a linear ramp generator having an output voltage whose amplitude is a linear function of the time elapsed between the receipt of a first (start) pulse and a second (stop) pulse. A commercially available time to amplitude converter which may be used in the present invention is sold by Tennelec Corporation under Part No. TC861. An AND gate 32 having inputs coupled to the respective linear ramp generators within the time to amplitude converters 30 has its output coupled to the Z axis of an oscilloscope 34. The AND gate 32 ensures that the electron beam with oscilloscope 34 is turned on to cause a visible spot only when an electron image has impinged upon resistive anode 22. This condition only exits when the linear ramp generators contained within the respective time to amplitude converters 30 are both turned on. The other outputs of the time to amplitude converters 30 are respectively coupled to the X and Y axes of oscilloscope 34. Since the amplitude of the respective outputs from the time to amplitude converters 30 is a linear function of the time which has elapsed between electron impact on resistive anode 22 and the arrival of current pulses at the respective contact electrodes 24, the coordinates of the electron beam of the CRT of oscilloscope 34 correspond to the position of impact of the electrons on resistive anode 22.

The normal operating potentials of the parts of the resistive anode image converter are as follows. The front surface 18 of microchannel plate 18 is maintained at −2000 volts with the particle rejection grid 17 being biased positively with respect thereto to repel low energy ions to which the resistive image anode converter 10 is sensitive. The back surface 19 of the resistive anode image converter 10 is maintained at approximately −200 volts which causes the middle floating electrode 21 to have a potential of approximately −1000 volts. The −1000 volts potential of electrode 21 is caused by the distributed impedance characteristically found between the front and back surfaces of a chevron configuration of cascaded microchannel electron multiplier plates. The resistive anode 22 is normally biased at ground potential.

The resistive anode image converter has a higher quantum efficiency than is found in other soft x-ray and ultraviolet electromagnetic radiation imaging apparatus. The following efficiencies are representative of the quantum efficiency of the resistive anode image converter as a function of wavelength.

| Quantum Efficiency | Wavelength of Incident Radiation |
|---|---|
| 1% at | 10 A° |
| 10% at | 200 – 300 A° |
| 15% at | 500 A° |
| 10% at | 1000 A° |

The resistive image anode converter 10 operates as follows. Incident photons or charged particles strike the front surface 18 causing the production of free electrons which are accelerated and multiplied as they strike the inner side walls of the individual channels. The resultant secondary electrons are repeatedly multiplied by their subsequent striking of the side walls of the individual channels. Thereafter, the multiplied and accelerated electron image transverses the microchannel electron multiplier plate 16 and strikes the resistive anode 22. The individual channels, because of their length and small diameter, collimate the electrons transversing the individual channels to ensure high spatial resolution within the electron image. Impact of the electron image on the resistive anode 22 causes current to flow from the points of impact of the electrons to the contact electrodes 24. The pulse position circuit 28, regardless of its design, produces electrical signals which represent the spatial coordinates of points of impact of the electrons upon the resistive anode 22 on a real time basis.

While the invention has been described in terms of a preferred embodiment, it will be apparent to those persons skilled in the art that numerous modifications may be made thereto without departing from the spirit and scope of the invention. It is intended that these modifications fall within the spirit and scope of the appended claims.

What we claim as our invention is:

1. An apparatus for imaging incident electromagnetic radiation ranging in wavelengths from approximately 10 A° to 2000 A° and charged particles comprising:
    a. means for detecting said radiation and charged particles and for producing an amplified and accelerated electron image which corresponds spatially to the incident radiation and charged particles;
    b. a continuous resistive target disposed in the path of said amplified and accelerated electron image; and
    c. means electrically coupled to said continuous resistive target for producing signals representative of at least one of the two spatial coordinates of the points of impact of the electrons upon said target which comprise said electron image.

2. In an imaging apparatus as recited in claim 1 wherein said means for detecting and for producing an amplified and accelerated electron image comprises:
    a. at least one microchannel electron multiplier plate.

3. In an imaging apparatus as recited in claim 2 wherein said means for detecting and producing an amplified and accelerated electron image consists of:
    a. a chevron configuration of two cascaded microchannel electron multiplier plates.

4. An imaging apparatus as recited in claim 1 further comprising:
    a. means for repelling low energy particles, said means for repelling particles being disposed between a source of incident electromagnetic radiation being imaged and said means for detecting said radiation and charged particles and for producing an amplified and accelerated electron image.

5. In an imaging apparatus as recited in claim 4 wherein said means for repelling low energy charged particles comprises:
    a. a grid which is positively biased with respect to a surface of said means for detection and for producing an amplified and accelerated electron image.

6. An imaging apparatus as recited in claim 1 further comprising:
    a. at least two contact electrodes mounted on the periphery of said continuous resistive target, said contacts being electrically coupled to said means for producing signals representative of at least one of the two spatial coordinates of the points of impact of the electrons upon said target which comprise said electron image.

7. In an imaging apparatus as recited in claim 6 further comprising:
    a. four contact electrodes mounted on the periphery of said continuous resistive target, said contacts being electrically coupled to said means for producing electrical signals representative of at least one of the two spatial coordinates of the points of impact of the electrons upon said target which comprise said electron image; and
    b. said means for producing signals representative of at least one of the two spatial coordinates including additional means to permit the producing of electrical signals representative of both the spatial coordinates of the points of impact of the electrons upon said target which comprise said electron image.

8. In an apparatus as recited in claim 7 wherein said means for producing electrical signals representative of the two spatial coordinates of the points of impact of the electrons which comprise said electron image upon said target comprises:
    a. four amplifiers each respectively having an input and output, each of said inputs being respectively coupled to a different contact electrode;
    b. a first time to amplitude converter having two inputs and two outputs;
    c. a second time to amplitude converter having two inputs and two outputs;
    d. an AND gate having two inputs and an output, said inputs being respectively coupled to one of the outputs of said first and second time to amplitude converters;
    e. an oscilloscope having X, Y and Z modulation axes;
    f. said X axis being coupled to the remaining output of said first time to amplitude converter;
    g. said Y axis being coupled to the remaining output of said second time to amplitude converter;
    h. said Z axis being coupled to said output of said AND gate; and
    i. a pair of said outputs of said four amplifiers being respectively coupled to said two inputs of said first time to amplitude converter and a second pair of said outputs of said four amplifiers being coupled to said two inputs of said second time to amplitude converter.

9. An imaging apparatus as discussed in claim 8 wherein:
   a. said continuous resistive target is a parallelogram;
   b. said four contact electrodes are respectively disposed on the periphery of said parallelogram;
   c. said inputs of said first time to amplitude converter are electronically coupled to two of said contact electrodes which are disposed oppositely on said resistive target; and
   d. said inputs of said second time to amplitude circuit are electrically coupled to the remaining two contact electrodes which are disposed oppositely on said resistive target.

* * * * *